(12) United States Patent
Aviv

(10) Patent No.: US 7,497,378 B2
(45) Date of Patent: Mar. 3, 2009

(54) ANTI-TAMPERING PROTECTION FOR MAGNETIC STRIPE READER

(75) Inventor: Arnon Aviv, Hertzeliya (IL)

(73) Assignee: Verifone, Inc., San Jose, CA (US)

( * ) Notice: Subject to any disclaimer, the term of this patent is extended or adjusted under 35 U.S.C. 154(b) by 12 days.

(21) Appl. No.: 11/636,369

(22) Filed: Dec. 8, 2006

(65) Prior Publication Data

US 2008/0135617 A1    Jun. 12, 2008

(51) Int. Cl.
*G06K 7/08* (2006.01)
(52) U.S. Cl. .................. 235/449; 235/439; 235/493; 360/130.3; 360/234.4; 360/244.1; 360/264.8; 360/264.9
(58) Field of Classification Search ............ 235/449, 235/380, 439, 493; 439/67; 360/130.3, 264.8, 360/264.9, 234, 244.1
See application file for complete search history.

(56) References Cited

U.S. PATENT DOCUMENTS

| 4,877,947 | A | * | 10/1989 | Mori | ........................... | 235/380 |
|---|---|---|---|---|---|---|
| 5,321,143 | A | * | 6/1994 | Sharpless et al. | .............. | 549/34 |
| 5,561,282 | A | * | 10/1996 | Price et al. | ................... | 235/380 |
| 5,861,662 | A | | 1/1999 | Candelore | | |
| 5,877,547 | A | | 3/1999 | Rhelimi | | |
| 5,998,858 | A | | 12/1999 | Little et al. | | |
| 6,438,825 | B1 | | 8/2002 | Kuhn | | |
| 6,830,182 | B2 | | 12/2004 | Izuyama | | |
| 6,853,093 | B2 | | 2/2005 | Cohen et al. | | |
| 6,917,299 | B2 | | 7/2005 | Fu et al. | | |
| 7,309,012 | B2 | * | 12/2007 | von Mueller et al. | ........ | 235/449 |
| 2006/0049255 | A1 | | 3/2006 | Von Mueller et al. | | |
| 2006/0049256 | A1 | | 3/2006 | Von Mueller et al. | | |

FOREIGN PATENT DOCUMENTS

| EP | 0 375 545 | | 6/1990 |
|---|---|---|---|
| JP | 10293915 | A * | 11/1998 |
| JP | 2002108711 | | 2/2002 |
| WO | WO 2005/086546 | | 9/2005 |

* cited by examiner

*Primary Examiner*—Steven S Paik
*Assistant Examiner*—Tuyen K Vo
(74) *Attorney, Agent, or Firm*—Ladas and Parry LLP

(57) ABSTRACT

A magnetic stripe reading device including a magnetic head assembly including a mounting element, at least one information reading sensor having output contacts, the sensor being mounted in the mounting element and a flat cable coupled to the output contacts of the at least one information reading sensor, a portion of the flat cable being arranged in a doubled-over configuration over the output contacts, thereby to provide anti-tampering protection to the output contacts.

19 Claims, 5 Drawing Sheets

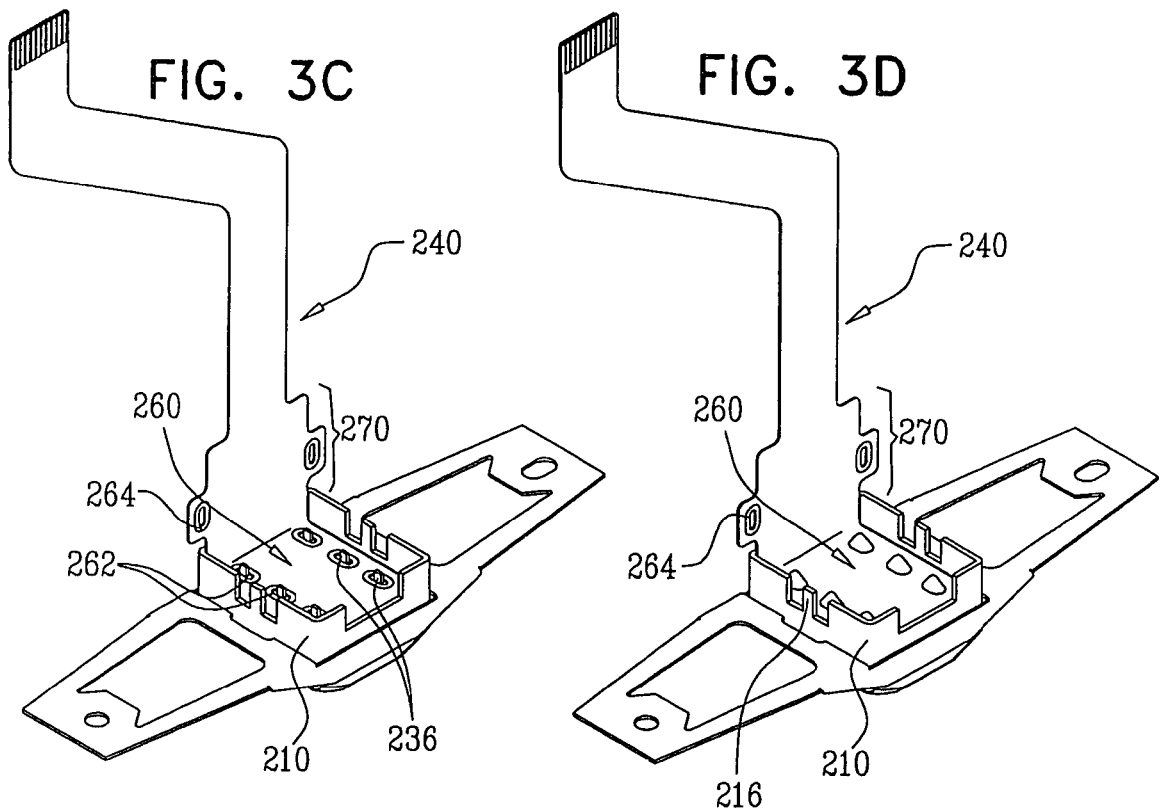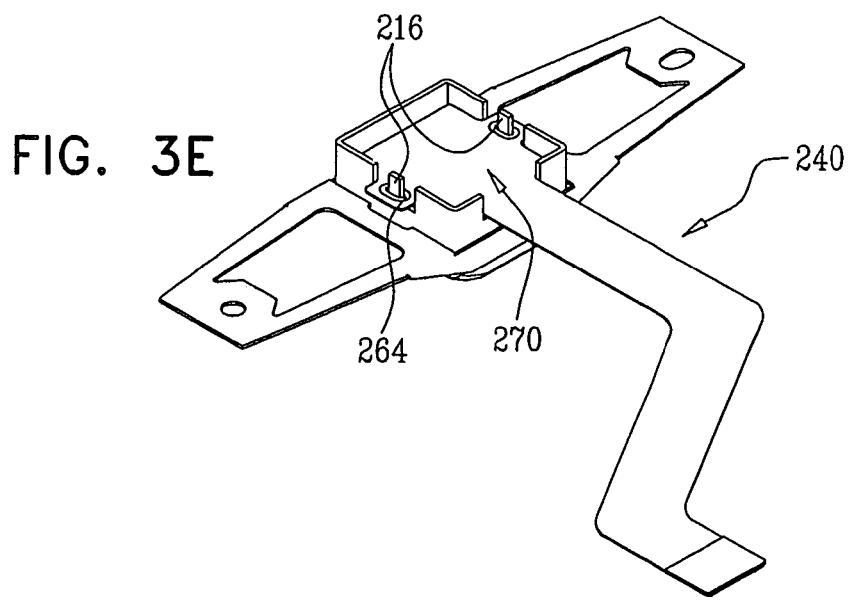

ANTI-TAMPERING PROTECTION FOR MAGNETIC STRIPE READER

FIELD OF THE INVENTION

The present invention relates to magnetic card readers generally and to devices, such as point of sale devices, employing magnetic card readers.

BACKGROUND OF THE INVENTION

Magnetic card readers are employed widely in various applications, including point of sale devices, including, for example, POS terminals, electronic cash registers and ATMs. Traditionally, there has been a concern with data security of such devices. The following patent publications represent the current state of the art: U.S. Pat. No. 6,853,093 and Published PCT Application No. WO 2005/086546 of the present assignee and U.S. Pat. Nos. 5,998,858; 5,861,662 and 6,917,299.

SUMMARY OF THE INVENTION

The present invention seeks to provide highly secure magnetic card readers and highly secure point of sale devices including such magnetic card readers.

There is thus provided in accordance with a preferred embodiment of the present invention a magnetic stripe reading device including a magnetic head assembly including a mounting element, at least one information reading sensor having output contacts, the sensor being mounted in the mounting element and a flat cable coupled to the output contacts of the at least one information reading sensor, a portion of the flat cable being arranged in a doubled-over configuration over the output contacts, thereby to provide anti-tampering protection to the output contacts.

There is also provided in accordance with another preferred embodiment of the present invention a point-of-sale device including a housing defining a keypad array location at which an array of keys are located and a display location at which a display is located, a magnetic card reader assembly associated with the housing and including a slot and magnetic stripe reading device, the magnetic stripe reading device including a magnetic head assembly including a mounting element, at least one information reading sensor having output contacts, the sensor being mounted in the mounting element and a flat cable coupled to the output contacts of the at least one information reading sensor, a portion of the flat cable being arranged in a doubled-over configuration over the output contacts, thereby to provide anti-tampering protection to the output contacts.

Preferably, the mounting element defines a peripheral anti-tampering enclosure and the at least one information reading sensor and the portion of the flat cable arranged in a doubled-over configuration are located within the peripheral anti-tampering enclosure. Additionally or alternatively, the flat cable includes multiple conductors arranged generally in a conductor plane and at least one protective wire grid arranged in a plane parallel to the conductor plane.

Preferably, the magnetic stripe reading device also includes a magnetic head assembly tamper detection and disabling circuit which is coupled to the at least one protective wire grid. Additionally or alternatively, the magnetic stripe reading device also includes a magnetic head assembly tamper detection and disabling circuit which is coupled to at least one of the multiple conductors.

Preferably, the at least one protective wire grid includes a plurality of wire grids arranged in at least two planes disposed on both sides of the conductor plane.

Preferably, the flat cable includes multiple conductors arranged generally in a conductor plane and at least one protective wire grid arranged in a plane parallel to the conductor plane. Additionally, a layer of epoxy is formed over the portion of the flat cable arranged in a doubled-over configuration over the output contacts within the enclosure. Alternatively, a layer of epoxy is formed over the portion of the flat cable arranged in a doubled-over configuration over the output contacts.

There is further provided in accordance with yet another preferred embodiment of the present invention a method of manufacturing a magnetic head assembly including mounting at least one information reading sensor having output contacts in a mounting element and coupling a flat cable to the output contacts of the at least one information reading sensor and doubling-over a portion of the flat cable over the output contacts, thereby to provide anti-tampering protection to the output contacts.

Preferably, the mounting element defines a peripheral anti-tampering enclosure and the at least one information reading sensor and the portion of the flat cable are arranged in a doubled-over configuration within the peripheral anti-tampering enclosure.

BRIEF DESCRIPTION OF THE DRAWINGS

The present invention will be understood and appreciated more fully from the following detailed description, taken in conjunction with the drawings in which:

FIGS. 3A, 3B, 3C, 3D, 3E, 3F & 3G are simplified illustrations of steps in a preferred method of manufacture of the magnetic head of FIGS. 1 & 2.

DETAILED DESCRIPTION OF A PREFERRED EMBODIMENT

Figure 1:
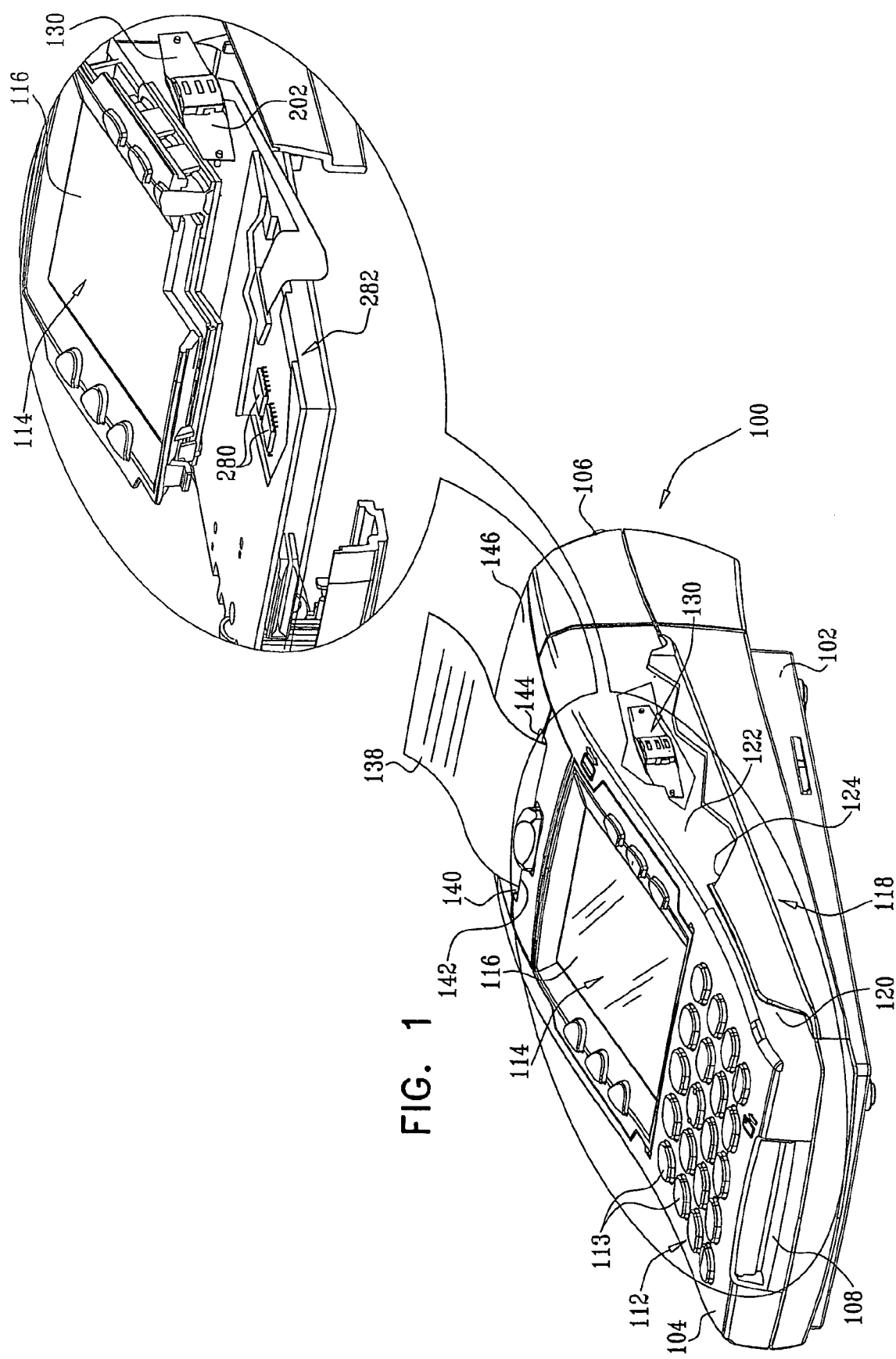
FIG. 1 is a simplified illustration of a point of sale terminal constructed and operative in accordance with a preferred embodiment of the present invention.

Reference is now made to FIG. 1, which illustrates a point of sale terminal constructed and operative in accordance with a preferred embodiment of the present invention. As seen in FIG. 1, the point of sale terminal may be generally similar in structure and function to a conventional point of sale terminal such as a NURIT 8100, commercially available from Verifone, Inc. It is appreciated that the present invention is not limited in its application to a given type or model of point of sale terminal but is applicable to magnetic stripe reading devices useful in any suitable point of sale device. Such a point of sale device may include, for example, a check reader, a card-based payment terminal, an electronic cash register, a PIN pad, an automatic teller machine (ATM), an automated kiosk and an electronic vending machine.

As seen in FIG. 1, the point of sale terminal preferably includes a housing 100 including a base portion 102 and a top portion 104, which are typically snap-fitted together. In the illustrated embodiment, the housing also includes a detachable and reattachable printer housing portion 106. The top portion 104 of housing 100 preferably defines a smart-card insertion slot 108, which communicates with a smart-card reader (not shown) located within the housing. The top portion 104 of the housing 100 also defines a keypad array location 112 wherein an array of keys 113 are located, and a display location 114, where a display, such as an LCD display 116, is located. Additionally, the top portion 104 of housing 100 preferably defines a magnetic card reader assembly 118, which includes a slot 120 having spaced surfaces 122 and 124. A magnetic head assembly 130 is mounted on surface 122, typically on an inside wall of surface 122.

A printer (not shown) is disposed within printer housing portion 106 and cooperates with a roll of paper (not shown), which is supported on a paper roll holder (not shown) located within printer housing portion 106. Printed receipts 138 are output via a printer paper slot 140 defined between an edge 142 of top portion 104 and a corresponding edge 144 of a paper roll cover 146.

Figure 2:
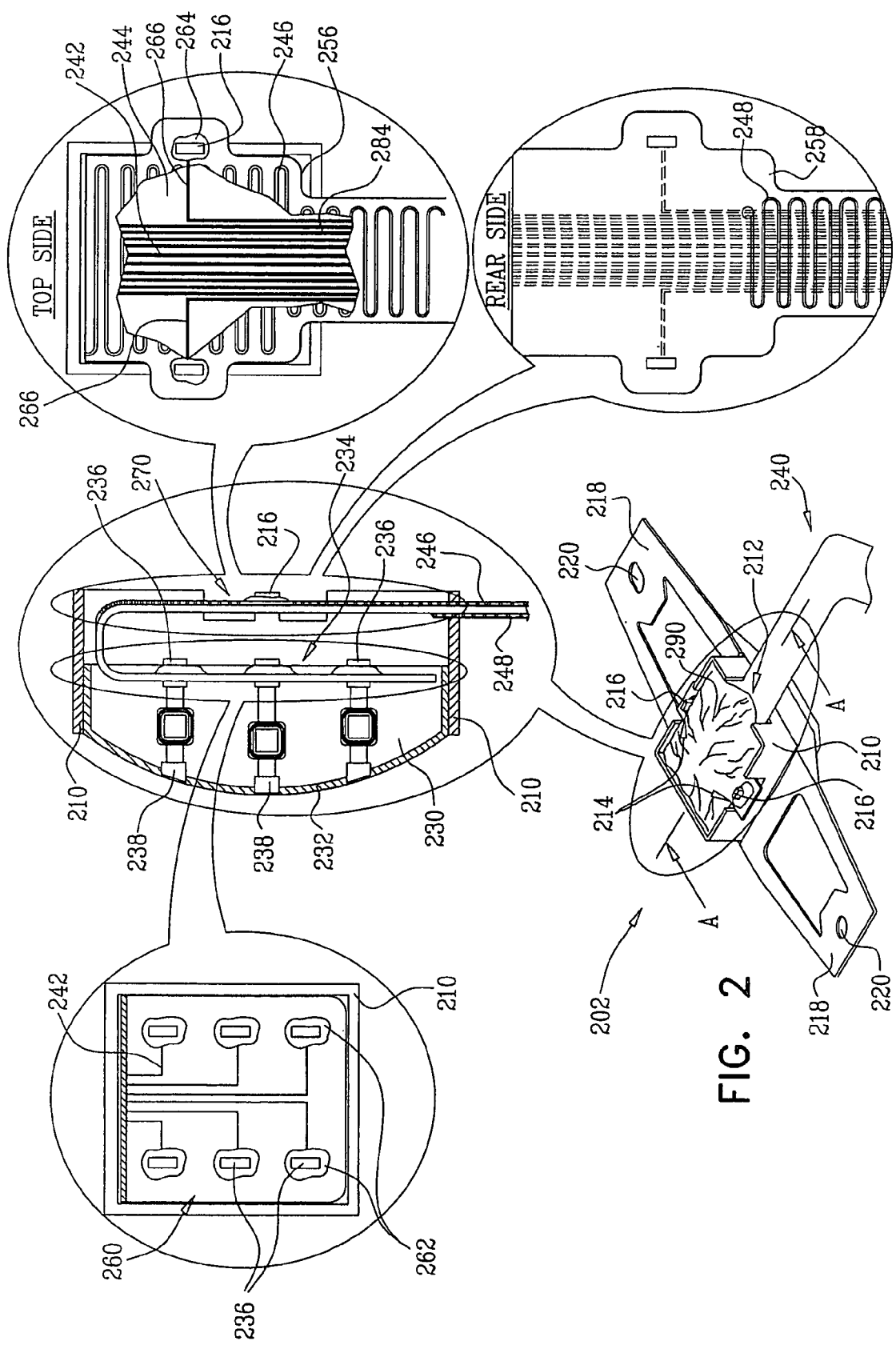
FIG. 2 is a simplified partially pictorial illustration of a magnetic head constructed and operative in accordance with a preferred embodiment of the present invention.

Reference is now made additionally to FIG. 2, which illustrates a magnetic head assembly 130 constructed and operative in accordance with a preferred embodiment of the present invention, which is useful in the magnetic card reader assembly 118. As seen in FIG. 2, the magnetic head assembly 130 preferably comprises a mounting element 202 which is typically mounted onto surface 122 of top portion 104.

Mounting element 202 is preferably formed of metal and preferably defines a peripheral enclosure 210 having an end slot 212 and two bifurcated side slots 214, each defining a ground contact 216. Extending axially sideways from the peripheral enclosure 210 are two winged, generally planar, somewhat flexible mounting portions 218 having mounting apertures 220 formed therein.

An information reading sensor 230, preferably a magnetic stripe reading sensor, such as an Apollo AP-3350B or AP-2250B, commercially available from Apollo (Zhuhai) Electronics Co., Ltd. Apollo Building, Lanpu Industrial Area E, Jiuzhou Road, Zhuhai, China 519070, is mounted within peripheral enclosure 210, such that a reading surface 232 of the sensor 230 extends outside of the enclosure 210 and the back 234 of the sensor, having electrical contacts 236 thereon, lies within the enclosure 210. Reading surface 232 includes one or more sensing regions 238 connected to contacts 236.

In accordance with a preferred embodiment of the present invention, a flat cable and connector assembly 240 is provided having a plurality of conductors 242 disposed in a conductor plane 244 and preferably having a pair of protective wire grids 246 and 248 disposed in respective planes 256 and 258 located on respective opposite sides of the conductor plane 244. The flat cable and connector assembly 240 includes a connector portion 260 preferably including plural plated-through contact apertures 262 for electrical connection to respective ones of contacts 236 and a pair of plated-through ground contact apertures 264 for electrical connection to respective ground contacts 216.

The connector portion 260 is electrically connected to electrical contacts 236, which extend through apertures 262, preferably by soldering, thereby establishing an electrical connection between the sensor 230 and at least some of conductors 242. Others of conductors 242, designated by reference numerals 266, are preferably coupled to ground by being soldered to respective ground contacts 216.

It is a particular feature of the present invention that, as seen in FIG. 2, a portion 270 of the flat cable and connector assembly 240 is arranged in a doubled-over configuration over the output contacts 236, thereby providing enhanced anti-tampering protection thereto. It is a further feature of the present invention that doubled-over portion 270 is located within the peripheral enclosure 210, which functions as an anti-tampering enclosure. Alternatively, the peripheral enclosure 210 may be eliminated and the doubled-over portion 270 is peripherally surrounded by epoxy, thus defining an alternative peripheral enclosure.

In accordance with a preferred embodiment of the present invention, as seen in FIG. 2, protective wire grid 246 extends over doubled-over portion 270. Grids 246 may be coupled to a magnetic head assembly tamper detection and disabling circuit 280. Additionally or alternatively one or more of conductors 242, here designated by reference numeral 284, which are not connected to electrical contacts 236 or ground contacts 216, are also coupled to tamper detection and disabling circuit 280. Circuit 280 is operative to erase encryption keys or other sensitive data upon sensed tampering with grid 246 and/or conductors 284.

Additionally, in accordance with a preferred embodiment of the present invention, protective wire grid 248 extends outwardly from doubled-over portion 270 and is coupled to tamper detection and disabling circuitry 280, preferably located within a protected region 282, of the type described and claimed in assignee's U.S. Pat. No. 6,853,093. Together with grid 246, grid 248 provides anti-tamper protection to the remainder of the flat cable and connector assembly 240. Preferably a layer 290 of epoxy is provided over doubled-over portion 270 within the enclosure 210, thereby providing a mechanically sealed, tamper-protected assembly.

Various types of suitable tamper detection and disabling circuits 280 are described in the following patent publications, the disclosures of which are hereby incorporated by reference: U.S. Pat. Nos. 5,998,858; 5,861,662 and 6,917,299.

Figure 3A:
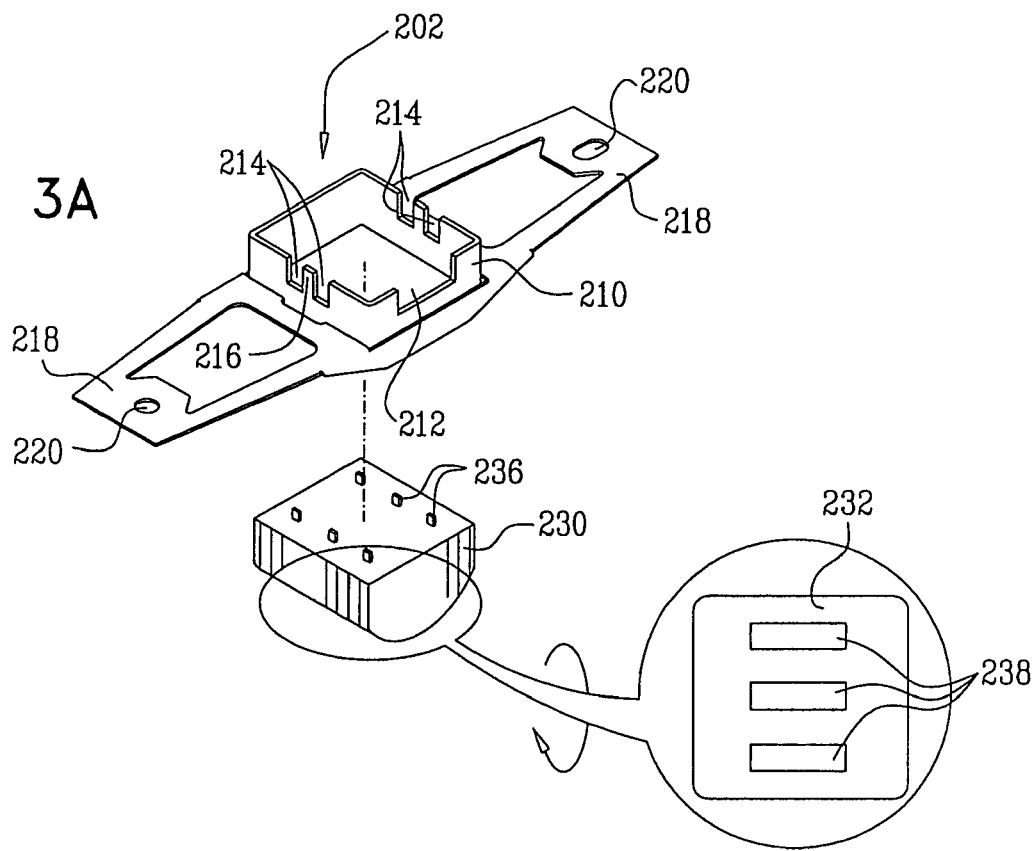
Figure 3B:
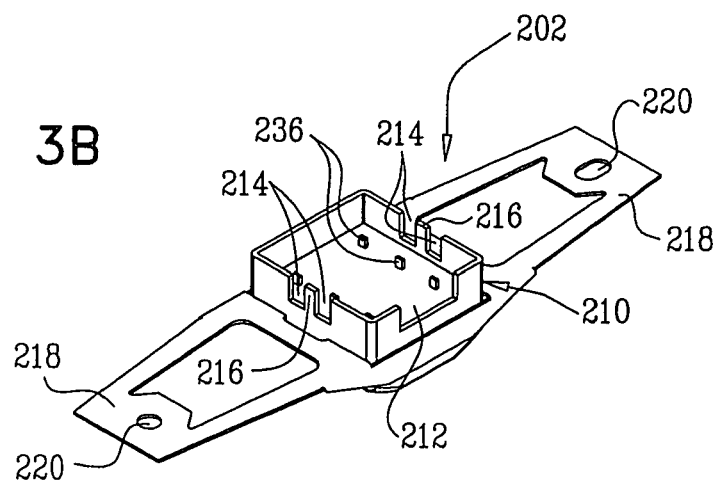

Reference is now made to FIGS. 3A-3G, which illustrate the manufacture of the magnetic head of FIGS. 1 & 2. FIGS. 3A and 3B show enclosure 210 associated with the mounting element 202. Preferably enclosure 210 is integrally formed with the mounting element 202. Alternatively it may be a separate piece which is joined to the mounting element 202. As a further alternative, it may be provided as part of sensor 230 in a customized version thereof. FIG. 3C illustrates connector portion 260 being mounted within enclosure 210 with apertures 262 engaging contacts 236. FIG. 3D shows the contacts 236 being soldered to the apertures 262.

Figure 3F:
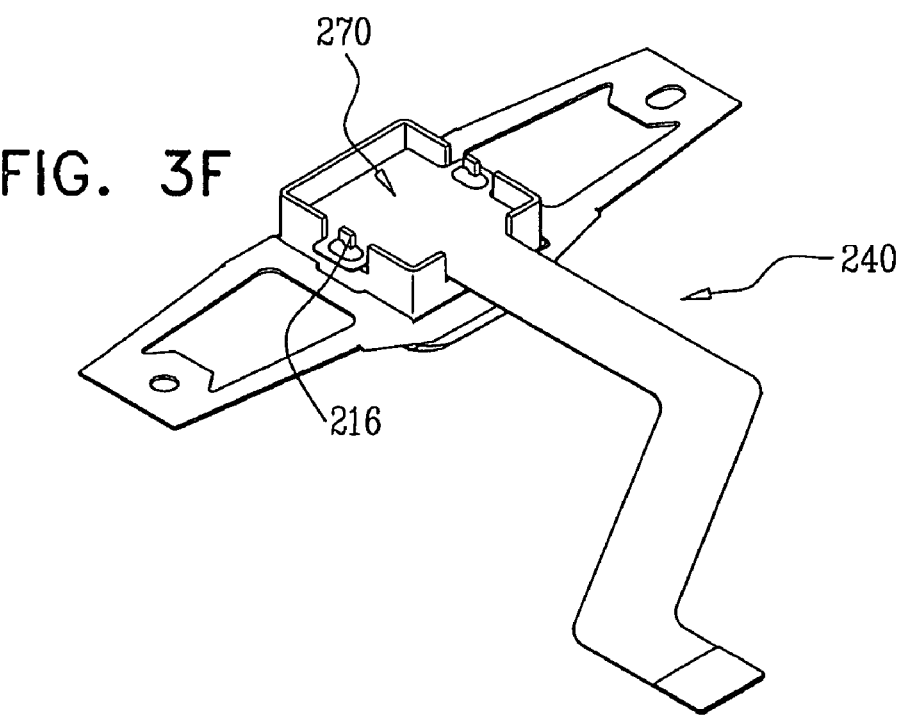
Figure 3G:
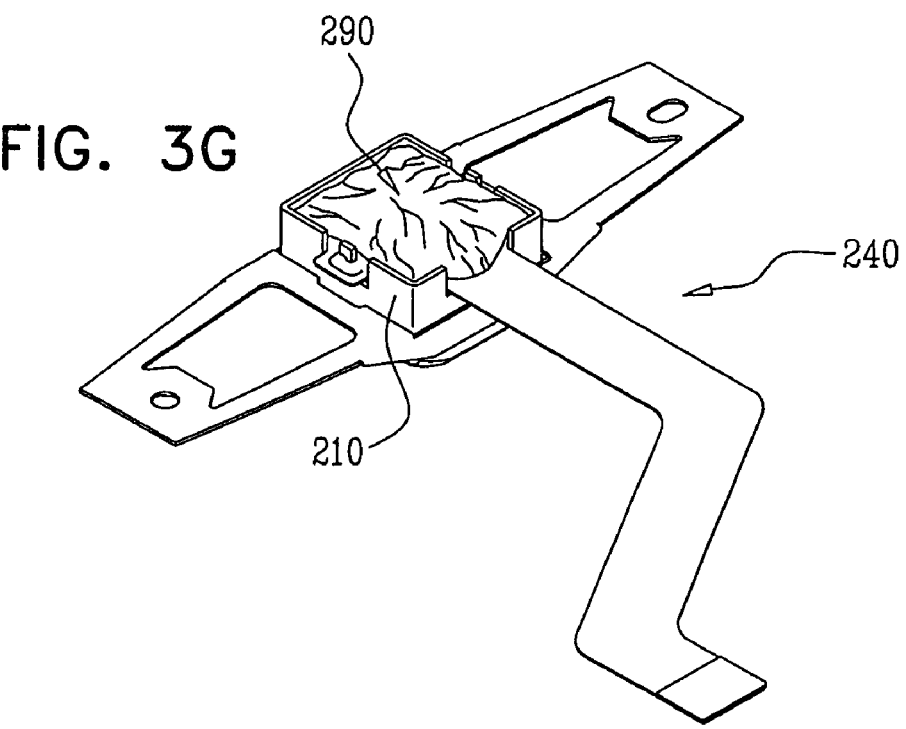

FIG. 3E shows doubled over portion 270 with apertures 264 engaging ground contacts 216. FIG. 3F shows soldering of ground contacts 216 to apertures 264. FIG. 3G shows an epoxy layer 290 formed over doubled-over portion 270 and filling enclosure 210.

It will be appreciated by persons skilled in the art that the present invention is not limited by what has been particularly shown and described hereinabove. Rather the scope of the present invention includes both combinations and sub-combinations of various feature of the invention and modifications thereof which may occur to persons skilled in the art upon reading the foregoing description and which are not in the prior art.

The invention claimed is:

1. A magnetic stripe reading device comprising:
a magnetic head assembly including:
a mounting element defining a peripheral anti-tampering enclosure;
at least one information reading sensor having output contacts, said sensor being mounted in said mounting element; and
a flat cable coupled to said output contacts of said at least one information reading sensor, a portion of said flat cable being arranged in a doubled-over configuration over said output contacts, thereby to provide anti-tampering protection to said output contacts,
said output contacts of said at least one information reading sensor and said portion of said flat cable arranged in a doubled-over configuration being located within said peripheral anti-tampering enclosure.

2. A magnetic stripe reading device according to claim 1 and wherein said flat cable comprises multiple conductors arranged generally in a conductor plane and at least one protective wire grid arranged in a plane parallel to said conductor plane.

3. A magnetic stripe reading device according to claim 2 and wherein a layer of epoxy is formed over said portion of said flat cable arranged in a doubled-over configuration over said output contacts within said peripheral anti-tampering enclosure.

4. A magnetic stripe reading device comprising:
a magnetic head assembly including:
a mounting element;
at least one information reading sensor having output contacts, said sensor being mounted in said mounting element; and
a flat cable, comprising multiple conductors arranged generally in a conductor plane and at least one protective wire grid arranged in a plane parallel to said conductor plane, coupled to said output contacts of said at least one information reading sensor, a portion of said flat cable being arranged in a doubled-over configuration over said output contacts, thereby to provide anti-tampering protection to said output contacts.

5. A magnetic stripe reading device according to claim 4 and also comprising a magnetic head assembly tamper detection and disabling circuit which is coupled to said at least one protective wire grid.

6. A magnetic stripe reading device according to claim 5 and wherein said magnetic head assembly tamper detection and disabling circuit is also coupled to at least one of said multiple conductors.

7. A magnetic stripe reading device according to claim 4 and also comprising a magnetic head assembly tamper detection and disabling circuit which is coupled to at least one of said multiple conductors.

8. A magnetic stripe reading device according to claim 4 and wherein said at least one protective wire grid comprises a plurality of wire grids arranged in at least two planes disposed on both sides of said conductor plane.

9. A magnetic stripe reading device according to claim 8 and wherein a layer of epoxy is formed over said portion of said flat cable arranged in a doubled-over configuration over said output contacts.

10. A point-of-sale device comprising:
a housing defining a keypad array location at which an array of keys are located and a display location at which a display is located; and
a magnetic card reader assembly associated with the housing and including a slot and magnetic stripe reading device, said magnetic stripe reading device comprising:
a magnetic head assembly including:
a mounting element defining a peripheral anti-tampering enclosure;
at least one information reading sensor having output contacts, said sensor being mounted in said mounting element; and
a flat cable coupled to said output contacts of said at least one information reading sensor, a portion of said flat cable being arranged in a doubled-over configuration over said output contacts, thereby to provide anti-tampering protection to said output contacts,
said output contacts of said at least one information reading sensor and said portion of said flat cable arranged in a doubled-over configuration being located within said peripheral anti-tampering enclosure.

11. A point-of-sale device according to claim 10 and wherein said flat cable comprises multiple conductors arranged generally in a conductor plane and at least one protective wire grid arranged in a plane parallel to said conductor plane.

12. A point-of-sale device according to claim 11 and wherein a layer of epoxy is formed over said portion of said flat cable arranged in a doubled-over configuration over said output contacts within said peripheral anti-tampering enclosure.

13. A point-of-sale device comprising:
a housing defining a keypad array location at which an array of keys are located and a display location at which a display is located;
a magnetic card reader assembly associated with the housing and including a slot and magnetic stripe reading device, said magnetic stripe reading device comprising:
a magnetic head assembly including:
a mounting element;
at least one information reading sensor having output contacts, said sensor being mounted in said mounting element; and
a flat cable, comprising multiple conductors arranged generally in a conductor plane and at least one protective wire grid arranged in a plane parallel to said conductor plane, coupled to said output contacts of said at least one information reading sensor, a portion of said flat cable being arranged in a doubled-over configuration over said output contacts, thereby to provide anti-tampering protection to said output contacts.

14. A point-of-sale device according to claim 13 and also comprising a magnetic head assembly tamper detection and disabling circuit which is coupled to said at least one protective wire grid.

15. A point-of-sale device according to claim 14 and wherein said magnetic head assembly tamper detection and disabling circuit is also coupled to at least one of said multiple conductors.

16. A point-of-sale device according to claim 13 and also comprising a magnetic head assembly tamper detection and disabling circuit which is coupled to at least one of said multiple conductors.

17. A point-of-sale device according to claim 13 and wherein said at least one protective wire grid comprises a plurality of wire grids arranged in at least two planes disposed on both sides of said conductor plane.

18. A point-of-sale device according to claim 17 and wherein a layer of epoxy is formed over said portion of said flat cable arranged in a doubled-over configuration over said output contacts.

19. A method of manufacturing a magnetic head assembly including:
mounting at least one information reading sensor having output contacts in a mounting element, said mounting element defining a peripheral anti-tampering enclosure;
coupling a flat cable to said output contacts of said at least one information reading sensor; and
doubling-over a portion of said flat cable over said output contacts, thereby to provide anti-tampering protection to said output contacts,
said output contacts of said at least one information reading sensor and said portion of said flat cable arranged in a doubled-over configuration being located within said peripheral anti-tampering enclosure.

* * * * *